United States Patent
Kobayashi

(10) Patent No.: US 10,324,447 B2
(45) Date of Patent: Jun. 18, 2019

(54) FOIL TRANSFER DEVICE, FOIL TRANSFER METHOD, AND SYSTEM CREATING DATA USABLE FOR FOIL TRANSFER DEVICE

(71) Applicant: Roland DG Corporation, Hamamatsu-shi, Shizuoka (JP)

(72) Inventor: Kouichi Kobayashi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 336 days.

(21) Appl. No.: 15/349,052

(22) Filed: Nov. 11, 2016

(65) Prior Publication Data

US 2017/0139395 A1    May 18, 2017

(30) Foreign Application Priority Data

Nov. 12, 2015  (JP) .................. 2015-222046

(51) Int. Cl.
*G06F 19/00* (2018.01)
*G05B 19/402* (2006.01)
(Continued)

(52) U.S. Cl.
CPC ............ *G05B 19/402* (2013.01); *B32B 3/085* (2013.01); *B32B 7/12* (2013.01); *B32B 9/025* (2013.01); *B32B 15/00* (2013.01); *B32B 15/04* (2013.01); *B32B 15/06* (2013.01); *B32B 15/10* (2013.01); *B32B 15/12* (2013.01); *B32B 21/00* (2013.01); *B32B 27/00* (2013.01); *B32B 29/00* (2013.01); *B32B 37/025* (2013.01); *B32B 37/06* (2013.01); *B32B 41/00* (2013.01); *B44C 1/1729* (2013.01); *G05B 19/048* (2013.01);
(Continued)

(58) Field of Classification Search
CPC ............ B32B 15/04; B32B 2310/0843; B32B 2309/70; B32B 37/025; G05B 2219/34135; G05B 19/00; G05B 19/4103; G05B 2219/34098; G05B 2219/49164
See application file for complete search history.

(56) References Cited

U.S. PATENT DOCUMENTS

| | | | | |
|---|---|---|---|---|
| 5,341,699 A | * | 8/1994 | Rouverol | ............... F16H 55/08 74/462 |
| 5,759,422 A | * | 6/1998 | Schmelzer | ............... B32B 3/22 156/250 |

(Continued)

FOREIGN PATENT DOCUMENTS

| | | |
|---|---|---|
| JP | 2002-240497 A | 8/2002 |
| JP | 2004-209818 A | 7/2004 |

*Primary Examiner* — Jaehwan Oh
(74) *Attorney, Agent, or Firm* — Keating & Bennett, LLP

(57) ABSTRACT

A foil transfer device, a foil transfer method, and a non-transitory computer readable medium storing a program when executed by a computer causes the computer to execute first, second and third processes. In the first process, an acute angle portion included in a contour of a predetermined shape is specified. In the second process, an approximation curve along a contour of the acute angle portion specified in the first process and is located inside the predetermined shape is obtained. In the third process, movement route data for the acute angle portion is created along the approximation curve obtained in the second process. The movement route data is usable for, for example, control of moving a heater of the foil transfer device.

17 Claims, 7 Drawing Sheets

(51) Int. Cl.
*B32B 37/00* (2006.01)
*B32B 37/06* (2006.01)
*B32B 41/00* (2006.01)
*G05B 19/048* (2006.01)
*B32B 7/12* (2006.01)
*B32B 9/02* (2006.01)
*B32B 15/00* (2006.01)
*B32B 15/04* (2006.01)
*B32B 15/06* (2006.01)
*B32B 15/10* (2006.01)
*B32B 15/12* (2006.01)
*B32B 21/00* (2006.01)
*B32B 27/00* (2006.01)
*B32B 29/00* (2006.01)
*B32B 3/08* (2006.01)
*B44C 1/17* (2006.01)

(52) U.S. Cl.
CPC ..... *B32B 2250/02* (2013.01); *B32B 2307/306* (2013.01); *B32B 2309/70* (2013.01); *B32B 2310/0843* (2013.01); *B32B 2311/00* (2013.01); *B32B 2451/00* (2013.01); *G05B 2219/37582* (2013.01); *Y02P 90/265* (2015.11)

(56) References Cited

U.S. PATENT DOCUMENTS

| | | | | |
|---|---|---|---|---|
| 5,778,790 | A * | 7/1998 | Peterson | B41C 1/1091 101/463.1 |
| 5,800,724 | A * | 9/1998 | Habeger | B32B 3/22 216/35 |
| 6,922,606 | B1 * | 7/2005 | Yutkowitz | G05B 19/00 318/560 |
| 2001/0048857 | A1 * | 12/2001 | Koch | G05B 19/4061 409/132 |
| 2017/0092955 | A1 * | 3/2017 | Ashizawa | H01M 10/0525 |

* cited by examiner

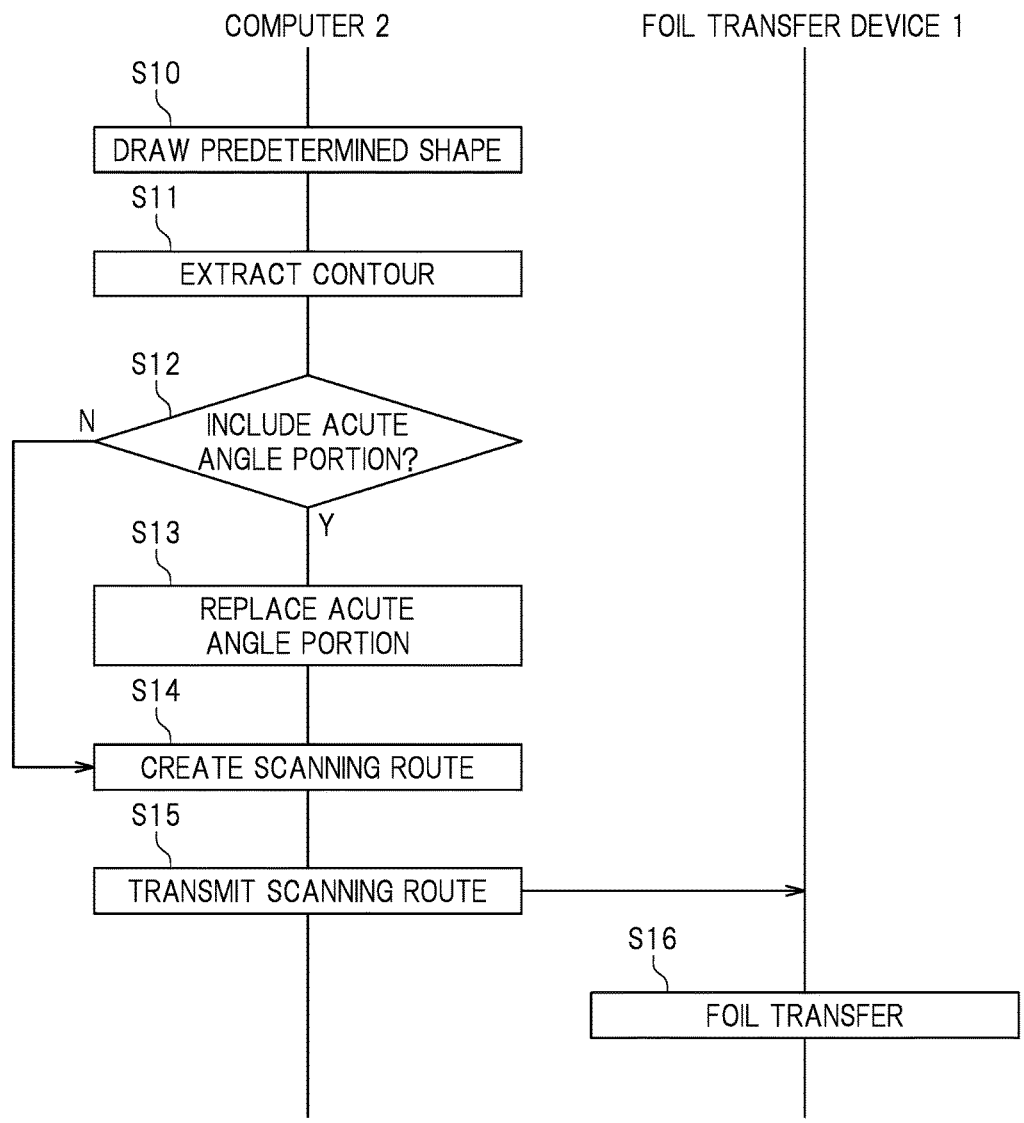

FOIL TRANSFER DEVICE, FOIL TRANSFER METHOD, AND SYSTEM CREATING DATA USABLE FOR FOIL TRANSFER DEVICE

CROSS REFERENCE TO RELATED APPLICATIONS

This application claims the benefit of priority to Japanese Patent Application No. 2015-222046 filed on Nov. 12, 2015. The entire contents of this application are hereby incorporated herein by reference.

BACKGROUND OF THE INVENTION

1. Field of the Invention

The subject technology relates to a foil transfer device, a foil transfer method and a system creating data usable for the foil transfer device.

2. Description of the Related Art

Conventionally, a metal foil is transferred to a paper medium, a leather item or the like (hereinafter, referred to as a "transfer target") to print a letter, a design, a graphic pattern or the like (hereinafter, referred to as a "letter or the like") on a surface of the transfer target. Printing a letter or the like with a metal foil improves the visual recognizability or decorativeness.

There are various methods for transferring such a metal foil. For example, a method using a thermal carving head having a heater mounted thereon is disclosed (see Japanese Laid-Open Patent Publication No. 2002-240497). According to this method, a metal foil pasted on a surface of a transfer target is scanned and pressed by a thermal carving head to perform foil transfer. In this case, a layer of an adhesive is provided between the transfer target and the metal foil. The adhesive is melted by the heat, and the transfer target and the metal foil are pressurized to each other to paste the transfer target and the metal foil to each other.

There is another method disclosed by which a metal foil is scanned by laser light to transfer the metal foil directly to a transfer target (see Japanese Laid-Open Patent Publication No. 2004-209818).

With these technologies, a route to be scanned by the thermal carving head or the laser light is preset along a contour of a letter or the like to be transferred. A foil transfer device causes the thermal carving head or the laser light to scan the metal foil along such a preset route to transfer the metal foil to the transfer target.

According to the knowledge of the present inventor, a letter or the like having a certain shape has an acute angle portion included therein. If the route to be scanned by the thermal carving head or the like is preset along the contour of the letter or the like in such a case, the acute angle portion is heated in an overlapping manner and thus the heat is concentrated thereon. As a result, the shape of the metal foil in the acute angle portion is destroyed, which causes a problem that an unevenness in the transferred metal foil occurs. The "acute angle portion" refers to a portion having an acute angle (for example, less than 90 degrees) made by two line segments.

SUMMARY OF THE INVENTION

According to a preferred embodiment of the present invention, a non-transitory computer readable medium includes a program, stored thereon, to be executed by a computer to perform a method including a first process of specifying an acute angle portion included in a contour of a predetermined shape; a second process of obtaining an approximation curve along a contour of the acute angle portion specified in the first process and located inside the predetermined shape; and a third process of creating movement route data for the acute angle portion along the approximation curve obtained in the second process.

The method performed by the computer creates the movement route data for the acute angle portion by executing the program stored on the non-transitory computer readable medium. The movement route data for the acute angle portion is usable as, for example, data used to move a heater of a foil transfer device. With such movement route data, the heater, when moving to perform foil transfer of a letter or the like including an acute angle portion, moves along the approximation curve obtained in the second process. Therefore, the metal foil which includes the acute angle portion is transferred more appropriately.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a flowchart showing an example of procedures executed by a computer and a foil transfer device according to a preferred embodiment of the present invention.

DETAILED DESCRIPTION OF THE PREFERRED EMBODIMENTS

Figure 7:
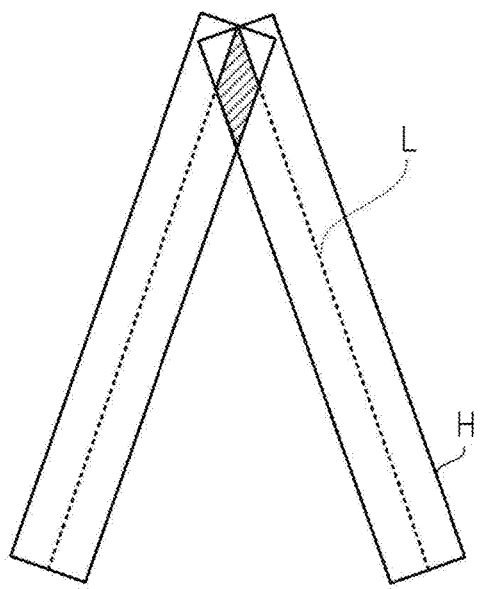
FIG. 7 is an enlarged view of an acute angle portion in a scanning route provided as a reference.

The present inventor presumes as follows regarding the phenomenon that when a letter or the like including an acute angle portion is transferred, an unevenness occurs to the transferred metal foil. For example, FIG. 7 is an enlarged view of an acute angle portion in a scanning route. In FIG. 7, the scanning route is represented by dashed line L, and an area to be heated is enclosed by solid line H (such an area will be referred to as "area H"). As shown in FIG. 7, the area H to be heated has a certain width because of the structure of a thermal carving head. Therefore, in the case where the scanning route L is scanned by the thermal carving head or the like, a portion having an acute angle in the area H to be heated is heated in an overlapping manner (the hatched portion in FIG. 7 is heated in an overlapping manner).

Therefore, such an acute angle portion of the metal foil is provided with an excessive amount of heat. As a result, the shape of the metal foil in the acute angle portion is deformed, which causes a problem that an unevenness occurs to the acute angle portion of the post-transfer metal foil. Metal foil transfer may be performed by, for example, irradiating and thus melting a metal foil with laser light to paste the metal foil to a transfer target. In this case, when laser light is directed and moved along a contour of the acute angle portion, the acute angle portion is provided with an excessive amount of heat. Such concentration of the heat on the acute angle portion may melt a larger amount of metal foil than is necessary. When this occurs, the amount of the pasted metal foil in the acute angle portion is larger than that in the remaining portion. This results in a state where the metal foil bulges in the acute angle portion as compared with in the remaining portion. Such a bulging portion may be different from the remaining portion in the darkness of the color or the degree of luster. More specifically, the transferred metal foil in the acute angle portion may be different from the remaining portion in the thickness, amount (in other words, density), color darkness, luster or the like. In this specification, a state where a portion of the metal foil is different from the rest of the metal foil in the thickness, amount (in other words, density), color darkness, luster or the like will be referred to as "unevenness" when necessary.

According to the knowledge of the present inventor, such a phenomenon is noticeable in the case where the letter or the like to be transferred is smaller than the diameter of a tip of the thermal carving head (portion of the thermal carving head which provides heat) or the optical diameter of laser light. For example, such a phenomenon is noticeable in the case where the minimum value of the coordinates forming the letter or the like is in units of about $\frac{1}{1000}$ mm, whereas the optical diameter of the laser light is about 0.1 mm to about 0.4 mm.

According to a preferred embodiment of the present invention, a non-transitory computer readable medium includes a program, stored thereon, to be executed by a computer to perform a method that is usable for, for example, a foil transfer device that causes a heater to scan a metal foil to transfer the metal foil in a predetermined shape to a transfer target. The program stored on the non-transitory computer readable medium causes a computer to create data of a scanning route along which a heating head scans the metal foil on the contour of the predetermined shape. In the case where the contour includes an acute angle portion, the program stored on the non-transitory computer readable medium causes the computer to replace a contour of the acute angle portion with a left-right uniform protruding curved line. When foil transfer of a letter or the like including an acute angle portion is performed, such a program decreases the unevenness caused to the post-transfer metal foil.

According to a preferred embodiment of the present invention, the left-right uniform protruding curved line is an approximation curve based on a probability density function of a normal distribution. With such a program stored on the non-transitory computer readable medium, the unevenness caused to the post-transfer metal foil is decreased, and the post-transfer metal foil has a shape closer to the predetermined shape drawn in advance.

According to a preferred embodiment of the present invention, a program stored on a non-transitory computer readable medium causes a computer to detect an apex of the acute angle portion from the contour of the predetermined shape, and determines the length of a first side and a second side of the acute angle from the apex. Next, the computer obtains an isosceles triangle including the apex from the acute angle portion (in other words, the computer extracts the isosceles triangle). The computer replaces a portion, in the obtained isosceles triangle that corresponds to the apex and the vicinity thereof, with a curve. As can be seen, by executing a program stored on the non-transitory computer readable medium according to a preferred embodiment of the present invention, a range in the acute angle portion that is to be replaced with a curve is determined.

According to a preferred embodiment of the present invention, the heater is a laser directing laser light, and the length of each of the two sides of the isosceles triangle having an equal or substantially equal length is longer than an optical diameter of the laser light.

Alternatively, according to another preferred embodiment of the present invention, the heater includes a heating head that applies heat to the transfer target and the metal foil, and the length of each of the two sides of the isosceles triangle having an equal or substantially equal length is longer than a diameter of the heating head. According to such a program stored on a non-transitory computer readable medium, the heat tending to concentrate on the acute angle portion at the time of foil transfer is dispersed.

A foil transfer device causes the heater to scan the metal foil based on the scanning route data created by the program stored on a non-transitory computer readable medium described above. In such a foil transfer device, the heater scans the metal foil while the heat applied to the metal foil is uniformly or substantially uniformly dispersed. Therefore, when foil transfer of a letter or the like including an acute angle portion is performed, the unevenness caused to the post-transfer metal foil is decreased or prevented.

A foil transfer method according to a preferred embodiment of the present invention causes the heater of the foil transfer device to scan a metal foil to transfer the metal foil in the predetermined shape to the transfer target. With the foil transfer method, for example, the scanning route along which the heater scans the metal foil is created along the contour of the predetermined shape. In the case where the contour includes an acute angle portion, a contour of the acute angle portion is replaced with a left-right uniform protruding curved line. With the foil transfer method, the heater scans the metal foil based on the scanning route obtained by replacing the contour of the acute angle portion with the curve. With such a foil transfer method, when foil transfer of a letter or the like including an acute angle portion is performed, the unevenness caused to the post-transfer metal foil is decreased.

With reference to FIG. 1 through FIG. 6, a program stored on a non-transitory computer readable medium, a foil transfer device and a foil transfer method according to various preferred embodiments of the present invention will be described.

Figure 1:
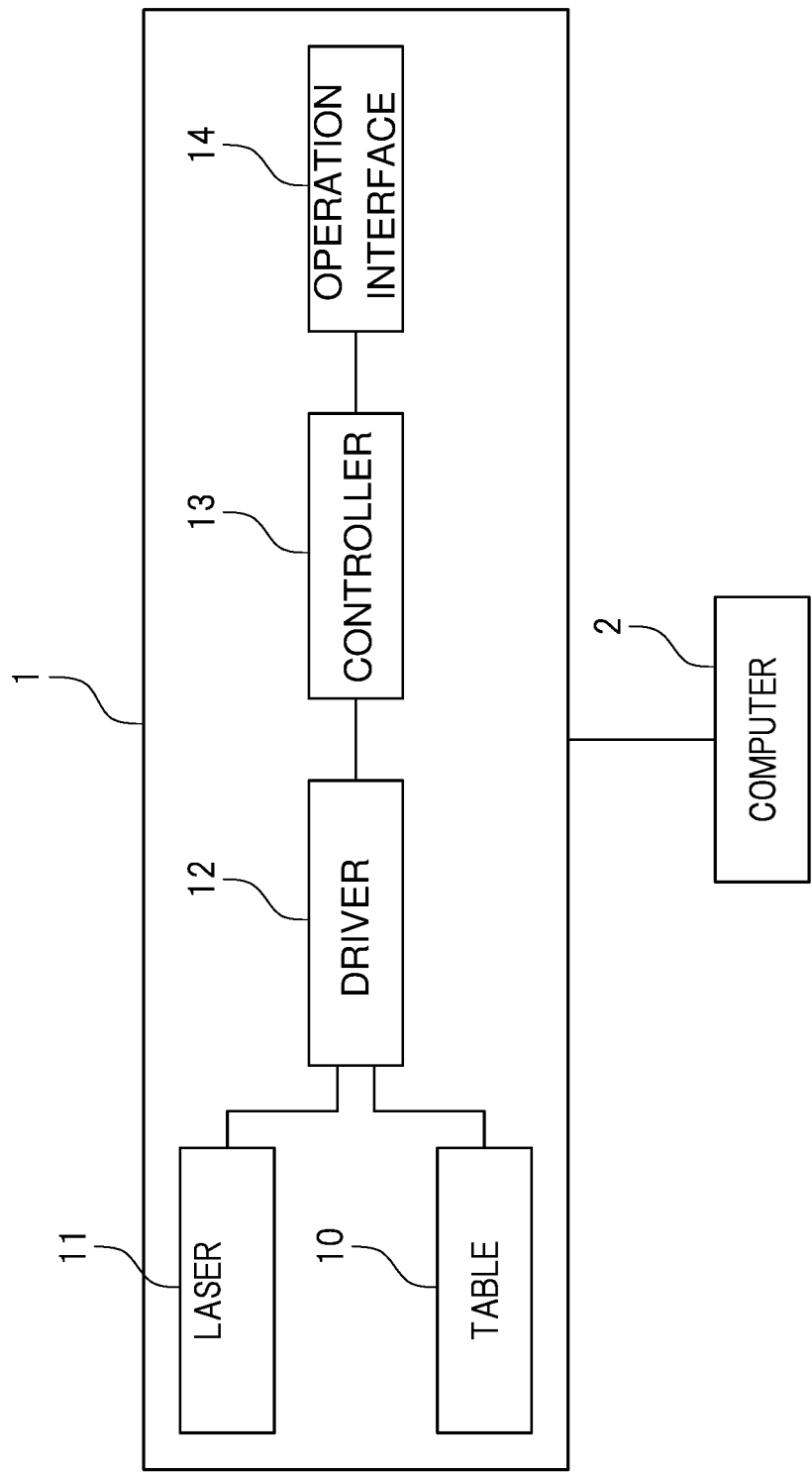
FIG. 1 is a block diagram of a foil transfer device according to a preferred embodiment of the present invention.

In the present preferred embodiment, a foil transfer device 1 scans a metal foil with a heater to transfer the metal foil in a predetermined shape to a transfer target. As shown in FIG. 1, the foil transfer device 1 includes a table 10, a laser 11, a driver 12, a controller 13, and an operation interface 14. The foil transfer device 1 is communicably connected with an external computer 2. Alternatively, the foil transfer device 1 may have a function of the computer 2. The foil transfer device 1 may include a support on which the transfer target is to be placed (in the preferred embodiment shown in FIG. 1, the table 10), the heater (in the preferred embodiment shown in FIG. 1, the laser 11), a mover moving the heater (in the preferred embodiment shown in FIG. 1, the driver 12), and a controller (in the preferred embodiment shown in FIG. 1, the controller 13, the operation interface 14, and the external computer 2). In the preferred embodiment shown in FIG. 1, the controller includes the controller 13 included in the foil transfer device 1 and the external computer 2. The controller is not limited to being provided in such a form. For example, the controller may be entirely included in the foil transfer device 1.

The table 10 is a portion on which the transfer target is placed. Among surfaces of the transfer target, a surface on which a letter or the like is transferred (transfer surface) is covered with the metal foil. The metal foil may be, for example, a gold foil. The transfer target may be formed of any of various heat-resistive materials including, for example, paper, leather, resin, wood and the like. In this preferred embodiment, a layer of an adhesive is provided between the metal foil and the transfer target.

The laser 11 directs laser light having a predetermined wavelength toward the transfer surface of the transfer target covered with the metal foil. The target is placed on the table 10. The laser light to be directed has an optical diameter of, for example, about 0.1 mm to about 0.4 mm. The laser is an example of the "heater".

Figure 2A:
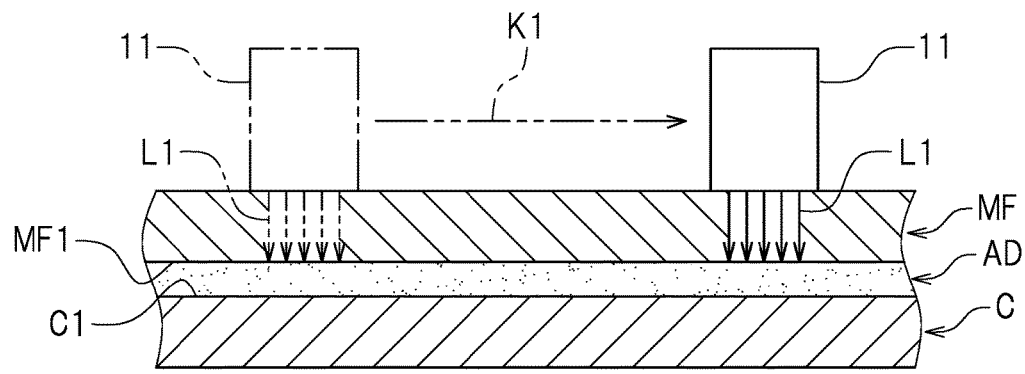
FIG. 2A is a schematic cross-sectional view showing a transfer target, a metal foil and an adhesive according to a preferred embodiment of the present invention.
Figure 2B:
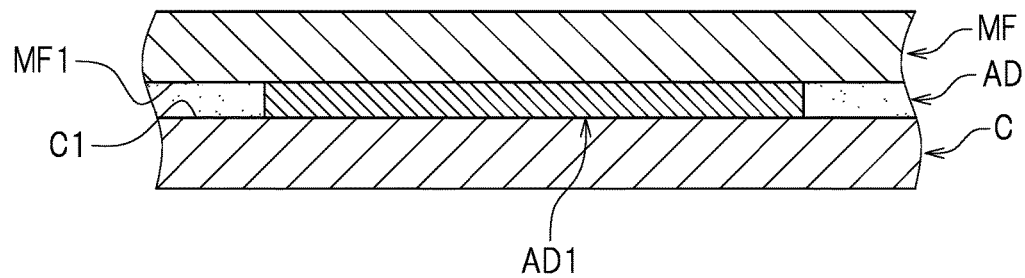
FIG. 2B is a schematic cross-sectional view showing the transfer target, the metal foil and the adhesive according to a preferred embodiment of the present invention.
Figure 2C:
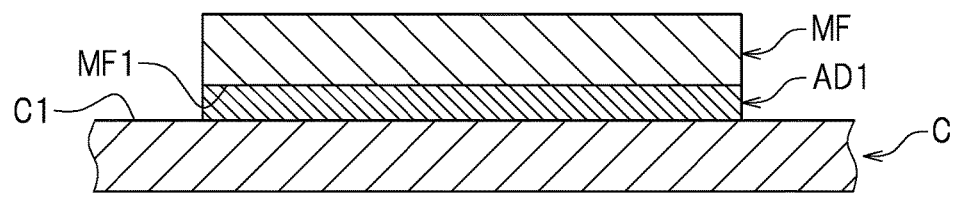
FIG. 2C is a schematic cross-sectional view showing the transfer target, the metal foil and the adhesive according to a preferred embodiment of the present invention.

With reference to FIG. 2A through FIG. 2C, an example of transfer of the metal foil will be described. FIG. 2A through FIG. 2C are each a schematic cross-sectional view of a transfer target C including a transfer surface C1, a metal foil MF covering the transfer surface C1, and an adhesive AD provided between the transfer target C and the metal foil MF. The adhesive AD is applied to a surface MF1, of the metal foil MF, facing the transfer surface C1 of the transfer target C. In FIG. 2A, the metal foil MF is stacked on the transfer target C in a state where the surface MF1 thereof, on which the adhesive AD is applied, is directed toward the transfer surface C1 of the transfer target C. FIG. 2A schematically shows that the laser light is directed from the side of the metal foil MF toward an area where the metal foil MF and the transfer target C are stacked on each other.

As shown in FIG. 2A, the laser 11 moves along a predetermined scanning route K1 while directing the laser light toward the metal foil MF. In FIG. 2A, arrows L1 represent the laser light directed from the laser 11, and dashed arrow K1 represents a predetermined scanning route in which the laser 11 moves. The laser 11 directs the laser light L1 toward the metal foil MF while moving along the predetermined scanning route K1. In an area irradiated with the laser light L1, the adhesive AD is melted by the heat of the laser light L1. FIG. 2B shows a state where the adhesive AD is melted to bond the metal foil MF to the transfer target C in the area irradiated with the laser light L1. In FIG. 2B, a hatched area AD1 is an area of the adhesive AD that is melted to bond the metal foil MF to the transfer target C. In the area where the adhesive AD is irradiated by the laser light L1 and thus is melted, the metal foil MF and the transfer target C are bonded together. After the laser light L1 finishes scanning the metal foil MF, the metal foil MF is peeled off from the transfer target C. FIG. 2C shows a state where the metal foil MF is peeled off from the transfer target C after the laser light L1 finishes scanning the metal foil MF. As shown in FIG. 2C, when the metal foil MF is peeled off from the transfer target C, an area of the metal foil MF corresponding to the area AD1 bonding the metal foil MF to the transfer target C is transferred to the transfer target C. An area of the metal foil MF corresponding to an area of the adhesive AD other than the area AD1 is peeled off from the transfer target C. In other words, as shown in FIG. 2A and FIG. 2C, only an area of the metal foil MF corresponding to the area of the adhesive AD irradiated with the laser light L1 is transferred to the transfer target C.

As shown in FIG. 1, the driver 12 is controlled by the controller 13 to drive the laser 11. Specifically, the driver 12 causes the laser 11 to scan the metal foil on the transfer target placed on the table 10 so as to direct the laser light L1 and pressurize the area irradiated with the laser light L1 (see FIG. 2A). The driver 12 may drive the table 10 as well as the laser 11.

The controller 13 is configured or programmed to perform various types of control in the foil transfer device 1. For example, the controller 13 controls the driver 12 based on the scanning route input from the computer 2 so that the driver 12 causes the laser 11 to scan the metal foil on the transfer target.

The operation interface 14 is usable by a user to input various information to the foil transfer device 1. The operation interface 14 may be a user interface including, for example, a display that displays the results of processing performed by the foil transfer device 1.

The computer 2 creates data on the scanning route along the contour of the letter or the like (having a predetermined shape) along which the metal foil is to be transferred to the transfer target, and transmits the data to the foil transfer device 1. The computer 2 may be, for example, a general purpose computer. The data on the scanning route is created by use of a predetermined program stored on a non-transitory computer readable medium (described below).

The program stored on a non-transitory computer readable medium according to the present preferred embodiment causes the computer 2 to create data on the scanning route along which the laser 11 is to scan the metal foil so that the foil transfer device 1 transfers the metal foil in a predetermined shape.

Specifically, a program stored on a non-transitory computer readable medium causes the computer 2 to extract a contour of a predetermined shape drawn in advance and to create data on the scanning route along the contour. The contour is extracted by, for example, specifying coordinate values representing the contour of the predetermined shape only, which are taken from a plurality of coordinate values forming the data of the drawn predetermined shape. The data on the scanning route may be created based on the extracted coordinate values representing the contour.

The data on the predetermined shape may be data created by use of a known system such as a CAD system or the like. Alternatively, a program stored on a non-transitory computer readable medium according to the present preferred embodiment may include a process of drawing the predetermined shape.

The contour of the predetermined shape may include an acute angle portion. In such a case, if the laser light L1 is directed toward the metal foil based on the scanning route created along the contour, it is highly possible that a portion of the area heated by the laser light L1 is heated in an overlapping manner. Such a portion of the metal foil may be excessively heated and deformed.

In the case where the contour includes an acute angle portion, a program stored on a non-transitory computer readable medium according to the present preferred embodiment causes the computer 2 to execute a process of replacing a contour of the acute angle portion with a left-right uniform protruding curved line.

Figure 3:
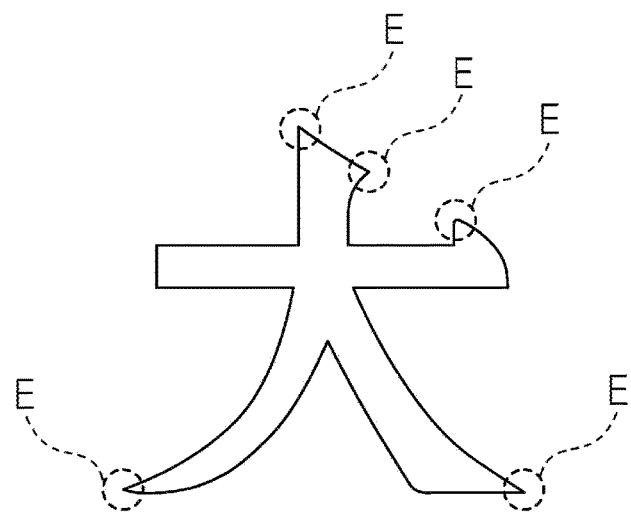
FIG. 3 shows an example of contour of a predetermined shape and an example of acute angle portions.

For example, the program stored on the non-transitory computer readable medium causes the computer 2 to analyze the extracted contour of the predetermined shape to specify whether or not the contour includes an acute angle portion. For example, as shown in FIG. 3, the computer 2 specifies acute angle portions E (portions represented by the dashed circles) from the contour of the Kanji character "大" in a Ming font.

In the case where the contour includes an acute angle portion, the program stored on the non-transitory computer readable medium causes the computer 2 to replace the contour of the acute angle portion with a left-right uniform protruding curved line. Then, the program stored on the non-transitory computer readable medium causes the computer 2 to create data of the scanning route along the contour including the post-replacement acute angle portion.

The shape of the curved line to replace the pre-replacement contour of the acute angle portion may be any protruding curved line as long as the portion to the left of the protruding tip and the portion to the right of the protruding tip have a uniform shape, for example, a portion of a circle or a parabola. It is preferable that the curved line is an approximation curve based on a probability density function of a normal distribution. By use of such an approximation curve, a scanning route closer to the drawn predetermined shape is created. Foil transfer performed based on such a scanning route reproduces a drawn predetermined shape more accurately.

The approximation curve based on the probability density function of the normal distribution is preferably generated by use of function f(x) in the following Expression 1.

Expression 1

$$f(x) = \frac{1}{\sqrt{2\pi\sigma^2}} c \times p\left(-\frac{(x\mu)^2}{2\sigma^2}\right) \quad (1)$$

The value of σ is a value of sin of the acute angle portion. The acute angle, which is smaller than 90 degrees, is in the range of larger than 0 degrees and smaller than 90 degrees in accordance with the drawn predetermined shape. If the contours of all the acute angle portions are replaced with the same approximation curve based on the probability density function of the normal distribution, the post-transfer product (hereinafter, referred to as a "transfer product") is diverted from the predetermined shape drawn in advance. Therefore, a probability density function may be set in accordance with the acute angle. In this case, the program causes the computer 2 to calculate the angle of each acute angle portion and apply the calculated acute angle to Expression 1.

Also in the case where the value of σ is excessively small, the transfer product is diverted from the drawn predetermined shape. Therefore, the value of σ may be set to a value larger than about 0.5 and about 1 or smaller (0.5<σ≤1), for example. Alternatively, a curve within about ±34% from the central value may be used based on the characteristics of the normal distribution, for example.

The value of μ preferably is 0 for the following reason. If the value of μ is other than 0, the axis dividing the acute angle portion into two approximately equally is shifted leftward or rightward. In the case where the value of μ is 0, the axis of the acute angle and the axis of the curve match each other when the pre-replacement contour of the acute angle portion is replaced with the curve based on the characteristics of the normal distribution.

Of the contour of the acute angle portion, a range to be replaced with the curve is determined as follows, for example. The following procedure is based on the program stored on a non-transitory computer readable medium in this preferred embodiment. FIG. 4A through FIG. 4D are each an enlarged view of the acute angle portion of the contour of the predetermined shape. In FIG. 4A through FIG. 4D, the contour of the acute angle portion is represented by side S1 and side S2.

Figure 4A:
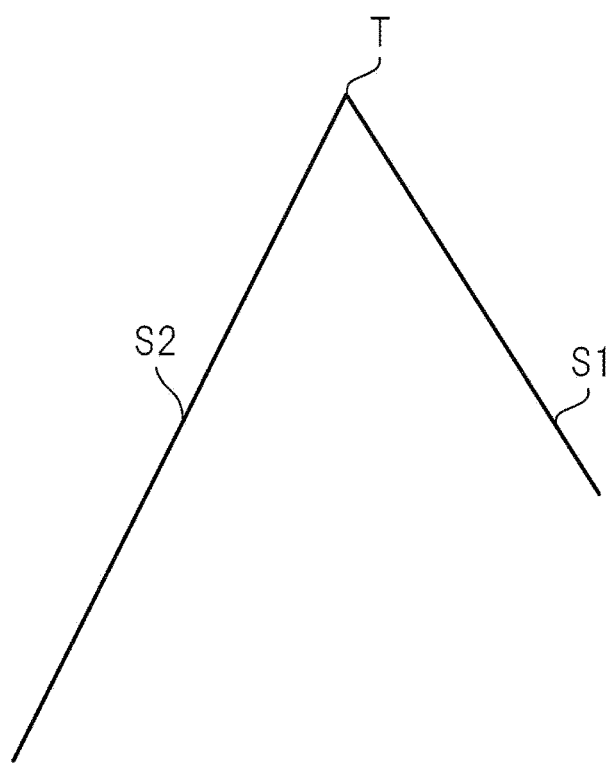
FIG. 4A is an enlarged view of an acute angle portion in the contour of the predetermined shape according to a preferred embodiment of the present invention.

As shown in FIG. 4A, the computer 2 detects an apex T of the acute angle from the extracted contour of the acute angle portion of the predetermined shape. The computer 2 determines the length of each of the side S1 and the side S2, forming the acute angle, from the apex T. In this case, for example, the computer 2 may determine the angle of the acute angle from the contour of the predetermined shape and obtain the side S1 and the side S2 from a straight line approximating the extracted contour of the acute angle portion.

Figure 4B:
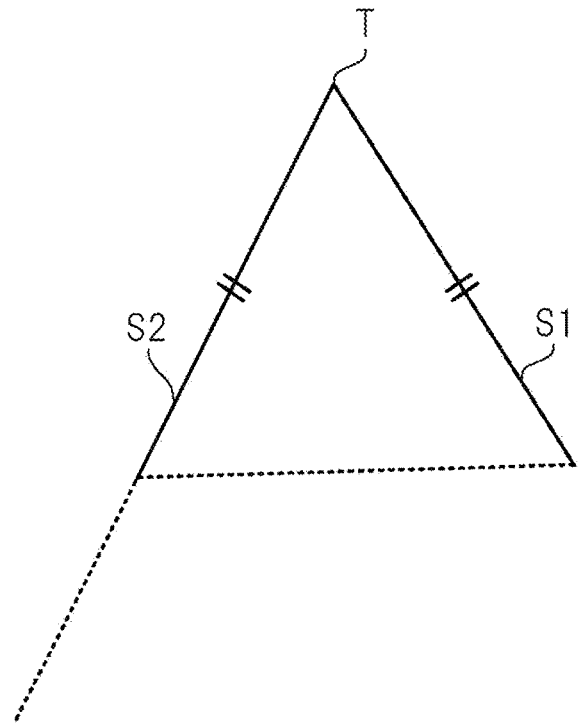
FIG. 4B is an enlarged view of the acute angle portion in the contour of the predetermined shape according to a preferred embodiment of the present invention.

As shown in FIG. 4B, the computer 2 cuts the side S2, which is longer of the two sides, in accordance with the length of the side S1, which is shorter. Namely, the computer 2 cuts the longer side S2 such that the sides S1 and S2 have an equal or substantially equal length. Thus, the computer 2 obtains an isosceles triangle having the side S1, the side S2 and the apex T from the acute angle portion.

Figure 4C:
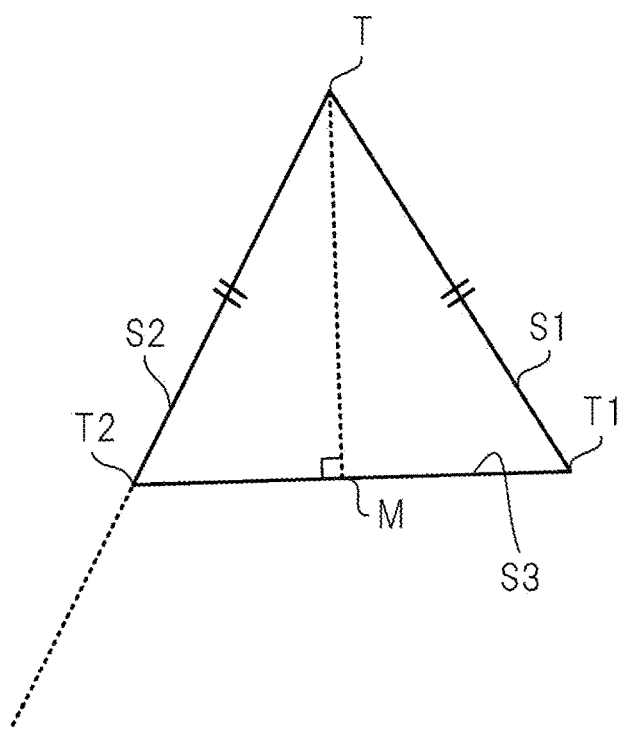
FIG. 4C is an enlarged view of the acute angle portion in the contour of the predetermined shape according to a preferred embodiment of the present invention.

FIG. 4C shows another method of obtaining an isosceles triangle including the apex T from the acute angle portion. According to this method, a line perpendicular or substantially perpendicular to the base of the triangle is extended from the apex T. For example, a triangle including the side S1 and the side S2 extending from the apex T is assumed. Such a triangle is not necessarily an isosceles triangle. Apexes T1 and T2, which are apexes of the triangle other than the apex T defined by the side S1 and the side S2, are connected to each other by a line segment, which is a base S3 of the triangle. Middle point M of such a base S3 is obtained. Next, a perpendicular line ML perpendicular or substantially perpendicular to such a base S3 is extended from the middle point M. The base S3 with which the perpendicular line ML passes the apex T between the side S1 and side S2 is determined. Thus, an isosceles triangle including the apex T is obtained from the acute angle portion. According to still another method, a line is extended from the apex T to the middle point M of the base S3. When the line TM laps over the line ML perpendicular or substantially perpendicular to the base S3, the apex T1 at which the base S3 and the side S1 cross each other and the apex T2 at which the side S3 and the side S2 cross each other are obtained. The side S1 extending between the apex T1 and the apex T and the side S2 extending between the apex T2 and the apex T have an equal or substantially equal length to each other.

Figure 4D:
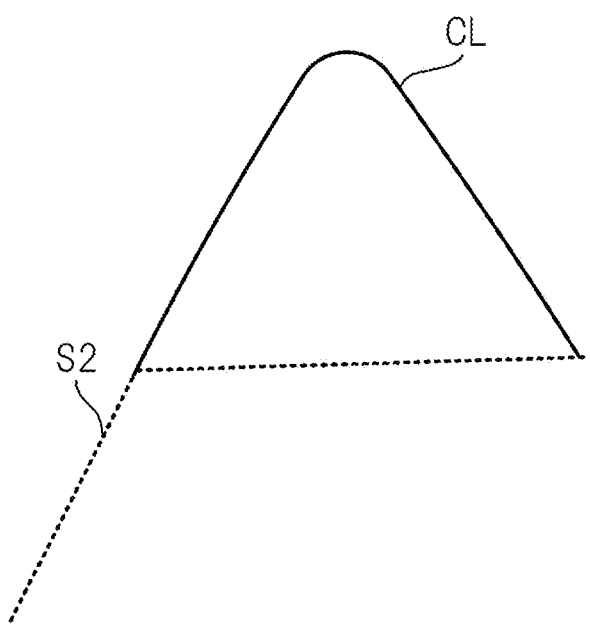
FIG. 4D is an enlarged view of the acute angle portion in the contour of the predetermined shape according to a preferred embodiment of the present invention.

As shown in FIG. 4D, the computer 2 replaces the contour of a portion corresponding to the isosceles triangle obtained from the acute angle portion with a left-right uniform protruding curved line CL.

From the point of view of dispersing the heat tending to concentrate on the acute angle portion at the time of foil transfer, it is preferable that the length of each of the side S1 and the side S2 of the isosceles triangle obtained from the acute angle portion is longer than optical diameter D of the laser light directed from the laser 11. For example, it is preferable that the length of each of the side S1 and the side S2 of the isosceles triangle is at least twice the optical diameter D of the laser light. In order to provide an effect of dispersing the heat from the acute angle portion, it is preferable that the length of each of the side S1 and the side S2 of the isosceles triangle is, for example, at least three times the optical diameter D of the laser light. As the length of each of the side S1 and the side S2 is greater, the effect of dispersing the heat tending to concentrate on the acute angle portion at the time of transfer is made greater. However, this may increase the degree of change in the shape of the foil of the acute angle portion. In order to reduce or prevent the degree of change in the shape of the foil of the acute angle portion small while providing the effect of dispersing the heat, it is preferable that the optical diameter D of the laser light directed for the thermal transfer is made small.

FIG. 5 is a flowchart showing an example of a process according to a preferred embodiment of the present invention. The left side of FIG. 5 shows a procedure executed by the computer 2. The right side of FIG. 5 shows a procedure executed by the foil transfer device 1.

Now, with reference to FIG. 5, an example of procedure of creating the scanning route executed by the computer 2 in this preferred embodiment and an example of foil transfer procedure executed by the foil transfer device 1 will be described.

Based on an input operation made by the user, the computer 2 draws a predetermined shape used for transferring the metal foil to the transfer target (S10).

The computer 2 extracts contour data in accordance with the predetermined shape drawn in S10 (S11).

The computer 2 determines whether or not the contour data extracted in S11 includes an acute angle portion (S12).

In the case where the contour data includes an acute angle portion (Y (yes) in S12), the computer 2 replaces a contour of the acute angle portion with a left-right uniform protruding curved line (S13). In the case where the contour data does not include an acute angle portion (N (no) in S12), the computer 2 does not perform S13. The computer 2 creates scanning route data in accordance with the contour data extracted in S11 or corrected data obtained by replacing the contour of the acute angle portion with the left-right uniform protruding curved line in S13 (creation of a scanning route; S14). The computer 2 transmits the scanning route data created in S14 to the foil transfer device 1 (S15). The transmission of the scanning route data to the foil transfer device 1 is also referred to as "scanning route transmission".

The foil transfer device 1 causes the laser 11 (see FIG. 1) to scan the metal foil based on the received scanning route data. As a result, the metal foil is transferred in accordance with the predetermined shape drawn by the computer 2 in S10 based on the input operation of the user (S16). The transfer of the metal foil in accordance with the predetermined shape is also referred to as "foil transfer".

Figure 6:
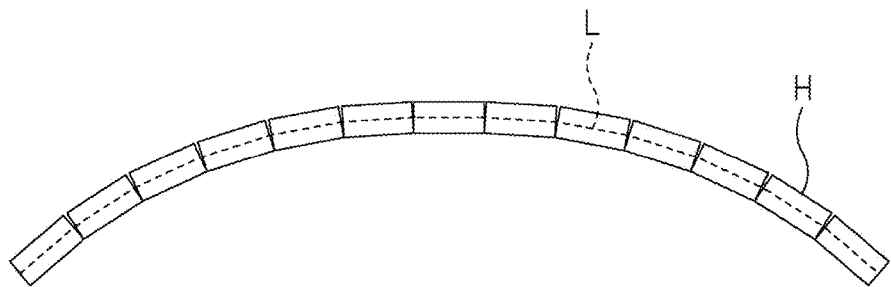
FIG. 6 is an enlarged view of a curved portion in a scanning route according to a preferred embodiment of the present invention.

As described above, with a program stored on a non-transitory computer readable medium according to the present preferred embodiment, in the case where the contour of the drawn predetermined shape includes an acute angle portion, a contour of the acute angle portion is replaced with a left-right uniform protruding curved line, and then the scanning route is created. FIG. 6 schematically shows the area H to be heated in the case where the laser light scans the metal foil along a curved scanning route L. As shown in FIG. 6, in the case where the laser light scans the metal foil along the curved scanning route L, the situation where an area is scanned in an overlapping manner does not occur easily. This allows the heat generated in the metal foil by the laser light to be dispersed uniformly, and thus the metal foil is not deformed easily. Namely, unevenness does not occur easily to the post-transfer letter or the like, and thus a high-quality foil transferred product is provided.

The area to be replaced with the curved line is limited to the acute angle portion. Therefore, the contour of the drawn predetermined shape is not significantly changed by the foil transfer.

The program stored on a non-transitory computer readable medium according to the present preferred embodiment is usable for a foil transfer device using heat of a heater, instead of heat of the laser light. In this case, a portion that applies heat to the metal foil and the transfer target (e.g., "heating head" such as the heating carving head in Japanese Laid-Open Patent Publication No. 2002-240497) corresponds to the "heater". In this case, it is preferable that the length of each of the side S1 and the side S2 of the isosceles triangle to be obtained is longer than the diameter of the heating head. In other words, to transfer the metal foil in a shape having an acute angle portion, it is preferable to select a heating head having a diameter shorter than the length of each of the side S1 and the side S2 of the isosceles triangle to be obtained as described above.

The program stored on the non-transitory computer readable medium according to the present preferred embodiment is also usable for foil transfer performed without a layer of an adhesive as in Japanese Laid-Open Patent Publication No. 2004-209818.

The computer program according the present preferred embodiment preferably is stored on, for example, a non-transitory computer readable medium. The program may be supplied to the computer via such a non-transitory computer readable medium. Examples of the non-transitory computer readable medium include magnetic storage mediums (e.g., flexible discs, magnetic tapes, hard disc drives), CD-ROMs (Read Only memories), and the like.

The above preferred embodiments are merely examples and do not limit the present invention in any way. The above-described structures, features, steps, etc. may be combined appropriately, and may be deleted, replaced or altered in any of various manners without departing from the gist of the present invention. The above-described preferred embodiments and modifications thereof are encompassed in the scope and the gist of the present invention as claimed in the claims of the present application and equivalents thereof.

A non-transitory computer readable medium according to a preferred embodiment of the present invention has a program stored thereon, the program causing a computer to execute a first process, a second process and a third process.

In the first process, an acute angle portion included in a contour of a predetermined shape is specified (see, for example, FIG. 3 and FIG. 5).

In the second process, an approximation curve that is along a contour of the acute angle portion specified in the first process and is located inside the predetermined shape is obtained (see, for example, FIG. 4A through FIG. 4D, and FIG. 5).

In the third process, movement route data for the acute angle portion is created along the approximation curve obtained in the second process (see FIG. 5).

The movement route data specifies a moving route for the acute angle portion as described above. The movement route data, for example, defines a movement route along which the heater of the foil transfer device 1 shown in FIG. 1 is going to move (in the above-described preferred embodiments, scanning route data).

The approximation curve may be based on, for example, a probability density function of a normal distribution.

According to such a program stored on the non-transitory computer readable medium, the computer creates the movement route data of the acute angle portion. The movement route data of the acute angle portion is usable as, for example, data to move the heater of the foil transfer device. With such movement route data, the heater, when moving to perform foil transfer of a letter or the like including an acute angle portion, moves along the approximation curve obtained in the second process. Therefore, the metal foil is transferred more appropriately to the acute angle portion.

The second process may include the following processes. Here, the processes will be described by way of the example shown in FIG. 4A, FIG. 4B and FIG. 4D.

The second process preferably includes a process of detecting the apex T of the acute angle portion as shown in FIG. 4A; a process of determining a length of each of the side S1 and the side S2, defining an acute angle of the acute angle portion, from the apex T as shown in FIG. 4A; a process of extracting an isosceles triangle as shown in FIG. 4B; and a process of replacing a portion of the acute angle portion that corresponds to the isosceles triangle with a curve as shown in FIG. 4D.

As shown in FIG. 4B, the isosceles triangle extracted herein includes the apex T has a side along the first side S1 and a side along the second side S2, the sides having an equal or substantially equal length to each other. The length of each of the two sides having the equal or substantially equal length is equal or substantially equal to either the length of the side S1 from the apex or the length of the side S2 from the apex which is shorter.

In this case, the approximation curve may be, for example, bilaterally symmetrical with respect to a line connecting a middle point of a base and the apex of the isosceles triangle, the line being perpendicular or substantially perpendicular to the base.

The program may cause the computer to further execute a fourth process of transmitting the movement route data to a foil transfer device.

A foil transfer device according to a preferred embodiment of the present invention includes a support, a heater, a mover, and a controller.

The support allows a transfer target to be placed thereon. In, for example, the foil transfer device 1 shown in FIG. 1, the table 10 corresponds to the support. In, for example, the foil transfer device 1 shown in FIG. 1, the heater may be included in the laser 11. The mover moves the heading end. In, for example, the foil transfer device 1 shown in FIG. 1, the mover may be included in the driver 12.

The controller includes a storage, a first processor, a second processor, a third processor, and a fourth processor.

The storage stores data of a shape of a metal foil which is to be transferred to the transfer target placed on the support.

The first processor specifies an acute angle portion included in a contour of the shape stored on the storage.

The second processor obtains an approximation curve, the approximation curve created inside the shape and being along a contour of the acute angle portion specified by the first processor.

The third processor creates movement route data of the acute angle portion along the approximation curve obtained by the second processor.

The fourth processor controls the mover based on the movement route data.

With the foil transfer device according to such a preferred embodiment of the present invention, the heater, when moving to perform foil transfer of a letter or the like including an acute angle portion, moves along the approximation curve obtained in the second process. Therefore, the metal foil including the acute angle portion is transferred more appropriately.

The controller may be realized by, for example, a cooperation of the controller 13 included in the foil transfer device 1 and the external computer 2 as shown in FIG. 1. Alternatively, the controller 13 included in the foil transfer device 1 may perform all the functions of the controller.

The controller may include a first device and a second device.

In this case, the first device may include the storage, the first processor, the second processor, the third processor, and a transmitter transmitting the movement route data created by the third processor to the second device. The second device may include a receiver receiving the movement route data from the transmitter. In this case, the fourth processor may control the mover based on the movement route data received by the receiver.

The first device may be, for example, the external computer 2 as shown in FIG. 1, and the second device may be the controller 13 included in the foil transfer device 1.

In this case, the approximation curve may be based on a probability density function of a normal distribution.

The second processor may be configured or programmed to include the following processing modules: a first module that detects an apex of the acute angle portion; a second module that determines a length of each of a first side and a second side, both of which define an acute angle of the acute angle portion, from the apex; a third module that extracts an isosceles triangle including the apex, a side along the first side and a side along the second side, the sides both having a length equal or substantially equal to either the length of the first side from the apex or the length of the second side from the apex which is shorter; and a fourth module that obtains the approximation curve for the isosceles triangle in the acute angle portion.

The approximation curve may be bilaterally symmetrical with respect to a line connecting a middle point of a base and the apex of the isosceles triangle, the line being perpendicular or substantially perpendicular to the base.

The isosceles triangle and the approximation curve are understandable from, for example, FIG. 4A through FIG. 4D and the above description made with reference to these figures, and thus will not be described again.

A foil transfer method according to a preferred embodiment of the present invention is usable for a foil transfer device including a heater. The foil transfer method includes a first step, a second step, and a third step.

In the first step, an acute angle portion included in a contour of a shape in which a metal foil is to be transferred to a transfer target is specified.

In the second step, an approximation curve that is along a contour of the acute angle portion specified in the first step and is created inside the shape is obtained.

In the third step, when the heater moving on the transfer target in order to transfer the metal foil to the transfer target, the heater moves along the approximation curve obtained in the second step for the acute angle portion specified in the first step.

In this case, the approximation curve may be based on a probability density function of a normal distribution.

With the foil transfer method according to a preferred embodiment of the present invention, the heater, when moving to perform foil transfer of a letter or the like including an acute angle portion, moves along the approximation curve obtained in the second process. Therefore, the metal foil which includes the acute angle portion is transferred more appropriately.

The second step may include the following steps: detecting an apex of the acute angle portion; determining a length of each of a first side and a second side, both of which defines an acute angle of the acute angle portion, from the apex; extracting an isosceles triangle including the apex, a side along the first side and a side along the second side, the sides both having a length equal or substantially equal to either the length of the first side from the apex or the length of the second side from the apex which is shorter; and obtaining the approximation curve for the isosceles triangle in the acute angle portion.

In this case, the approximation curve may be bilaterally symmetrical with respect to a line connecting a middle point of a base and the apex of the isosceles triangle, the line being perpendicular or substantially perpendicular to the base.

In the foil transfer device or the foil transfer method according to a preferred embodiment of the present invention, the heater may be a laser directing laser light. In this case, the laser light may have an optical diameter shorter than the length of each of the sides of the isosceles triangle having the equal or substantially equal lengths.

In the foil transfer device or the foil transfer method according to a preferred embodiment of the present invention, the heater may include a heating head that applies heat to the transfer target and the metal foil. In this case, the heating head may have a diameter shorter than the length of each of the sides of the isosceles triangle having the equal or substantially equal lengths.

The terms and expressions used herein are for description only and are not to be interpreted in a limited sense. These terms and expressions should be recognized as not excluding any equivalents to the elements and steps shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A non-transitory computer readable medium including a program stored thereon that causes a computer to execute:
   a first process of specifying an acute angle portion included in a contour of a predetermined shape;
   a second process of obtaining an approximation curve obtained inside the predetermined shape along a contour of the acute angle portion specified in the first process;
   a third process of creating movement route data for the acute angle portion along the approximation curve obtained in the second process, and
   a fourth process of transmitting the movement route data to a foil transfer device.

2. The non-transitory computer readable medium according to claim 1, wherein the approximation curve is obtained based on a probability density function of a normal distribution.

3. The non-transitory computer readable medium according to claim 1, wherein the second process includes:
   a process of detecting an apex of the acute angle portion;
   a process of determining a length of each of a first side and a second side defining an acute angle of the acute angle portion, from the apex;
   a process of extracting an isosceles triangle including the apex, a side along the first side and a side along the second side, the sides both having a length equal or substantially equal to either the length of the first side from the apex or the length of the second side from the apex which is shorter; and
   a process of obtaining the approximation curve for the isosceles triangle in the acute angle portion.

4. The non-transitory computer readable medium according to claim 3, wherein the approximation curve is bilaterally symmetrical with respect to a line connecting a middle point of a base and the apex of the isosceles triangle, the line being perpendicular or substantially perpendicular to the base.

5. A foil transfer device, comprising:
   a support that allows a transfer target to be placed thereon;
   a heater;
   a mover that moves the heater; and
   a controller; wherein
   the controller is configured or programmed to include:
   a storage that stores data of a shape of a metal foil to be transferred to the transfer target placed on the support;
   a first processor that specifies an acute angle portion included in a contour of the shape stored on the storage;
   a second processor that obtains an approximation curve obtained inside the shape along a contour of the acute angle portion specified by the first processor;
   a third processor that creates movement route data for the acute angle portion along the approximation curve obtained by the second processor; and
   a fourth processor that controls the mover based on the movement route data.

6. The foil transfer device according to claim 5, wherein the controller is configured or programmed to include:
   a first device; and
   a second device;
   the first device includes:
   the storage;
   the first processor;
   the second processor;
   the third processor; and
   a transmitter that transmits the movement route data created by the third processor to the second device;
   the second device includes a receiver that receives the movement route data from the transmitter; and the fourth processor controls the mover based on the movement route data received by the receiver.

7. The foil transfer device according to claim 5, wherein the approximation curve is based on a probability density function of a normal distribution.

8. The foil transfer device according to claim 5, wherein the second processor is configured or programmed to include:
- a first module that detects an apex of the acute angle portion;
- a second module that determines a length of each of a first side and a second side, both of which defining an acute angle of the acute angle portion, from the apex;
- a third module that extracts an isosceles triangle including the apex, a side along the first side and a side along the second side, the sides both having a length equal or substantially equal to either the length of the first side from the apex or the length of the second side from the apex which is shorter; and
- a fourth module that obtains the approximation curve for the isosceles triangle in the acute angle portion.

9. The foil transfer device according to claim 8, wherein the approximation curve is bilaterally symmetrical with respect to a line connecting a middle point of a base and the apex of the isosceles triangle, the line being perpendicular or substantially perpendicular to the base.

10. The foil transfer device according to claim 8, wherein:
the heater includes a laser directing laser light; and
the laser light has an optical diameter shorter than a length of each of the sides of the isosceles triangle having the equal or substantially equal lengths.

11. The foil transfer device according to claim 8, wherein:
the heater includes a heating head that applies heat to the transfer target and the metal foil;
the heating head has a diameter shorter than a length of each of the sides of the isosceles triangle having the equal or substantially equal lengths.

12. A foil transfer method usable for a foil transfer device including a heater, the foil transfer method comprising:
- a first step of specifying an acute angle portion included in a contour of a shape in which a metal foil is to be transferred to a transfer target;
- a second step of obtaining an approximation curve along a contour of the acute angle portion specified in the first step and inside the shape; and
- a third step of moving, with respect to the transfer target, the heater along the approximation curve obtained in the second step for the acute angle portion specified in the first step to transfer the metal foil to the transfer target.

13. The foil transfer method according to claim 12, wherein the approximation curve is obtained based on a probability density function of a normal distribution.

14. The foil transfer method according to claim 12, wherein the second step includes the steps of:
- detecting an apex of the acute angle portion;
- determining a length of each of a first side and a second side, defining an acute angle of the acute angle portion, from the apex;
- extracting an isosceles triangle including the apex, a side along the first side and a side along the second side, the sides both having a length equal or substantially equal to either the length of the first side from the apex or the length of the second side from the apex which is shorter; and
- obtaining the approximation curve for the isosceles triangle in the acute angle portion.

15. The foil transfer method according to claim 14, wherein the approximation curve is bilaterally symmetrical with respect to a line connecting a middle point of a base and the apex of the isosceles triangle, the line being perpendicular or substantially perpendicular to the base.

16. The foil transfer method according to claim 14, wherein
the heater includes a laser directing laser light; and
the laser light has an optical diameter shorter than a length of each of the sides of the isosceles triangle having the equal or substantially equal lengths.

17. The foil transfer method according to claim 14, wherein:
the heater includes a heating head that applies heat to the transfer target and the metal foil;
the heating head has a diameter shorter than a length of each of the sides of the isosceles triangle having the equal or substantially equal lengths.

* * * * *